(12) United States Patent
Bar Yanai et al.

(10) Patent No.: US 11,765,093 B2
(45) Date of Patent: Sep. 19, 2023

(54) STATISTICAL FLOW AGING

(71) Applicant: MELLANOX TECHNOLOGIES, LTD., Yokneam (IL)

(72) Inventors: Roni Bar Yanai, Even Yehuda (IL); Eli Britstein, Beerotaim (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 12 days.

(21) Appl. No.: 17/671,625

(22) Filed: Feb. 15, 2022

(65) Prior Publication Data
US 2023/0262005 A1    Aug. 17, 2023

(51) Int. Cl.
| H04L 47/21 | (2022.01) |
| H04L 47/2483 | (2022.01) |
| H04L 47/62 | (2022.01) |
| H04L 47/283 | (2022.01) |
| H04L 47/78 | (2022.01) |

(52) U.S. Cl.
CPC .......... *H04L 47/2483* (2013.01); *H04L 47/21* (2013.01); *H04L 47/283* (2013.01); *H04L 47/6235* (2013.01); *H04L 47/78* (2013.01)

(58) Field of Classification Search
None
See application file for complete search history.

(56) References Cited

U.S. PATENT DOCUMENTS

| 10,616,101 | B1 * | 4/2020 | Peterson | H04L 47/11 |
| 2003/0037294 | A1 * | 2/2003 | Robsman | H04L 67/14 |
| | | | | 714/55 |
| 2007/0008884 | A1 * | 1/2007 | Tang | H04L 9/40 |
| | | | | 370/230 |
| 2014/0003441 | A1 * | 1/2014 | Shachar | H04L 47/10 |
| | | | | 370/400 |
| 2014/0112223 | A1 * | 4/2014 | Swann | H04W 76/38 |
| | | | | 370/311 |
| 2015/0286594 | A1 * | 10/2015 | Degani | G06F 13/4234 |
| | | | | 710/261 |
| 2016/0315841 | A1 * | 10/2016 | Kang | H04L 47/283 |
| 2018/0191624 | A1 * | 7/2018 | Haynold | H04L 47/12 |
| 2019/0089641 | A1 * | 3/2019 | Shattah | H04L 47/2441 |
| 2019/0089679 | A1 * | 3/2019 | Kahalon | H04L 47/20 |
| 2023/0014795 | A1 * | 1/2023 | Khan | H04L 41/147 |

OTHER PUBLICATIONS

Bhardwaj, "TCP RST Flag", Blog, IPWithEase, AAR Technosolutions, pp. 1-7, Sep. 28, 2020, as downloaded from https://ipwithease.com/tcp-rst-flag/.

Bhardwaj, "What is TCP FIN Packet", Blog, IPWithEase, AAR Technosolutions, pp. 1-7, Sep. 18, 2020, as downloaded from https://ipwithease.com/what-is-tcp-fin-packet/.

* cited by examiner

*Primary Examiner* — Nicholas Sloms
(74) *Attorney, Agent, or Firm* — KLIGLER & ASSOCIATES PATENT ATTORNEYS LTD (57) ABSTRACT

In one embodiment, a device includes an interface to send and receive packets of network flows, and processing circuitry to track a connection status of each of the network flows, selectively assign some network flows of the network flows having a non-terminated connection status to a flow aging process based on a statistical model of connection termination, operate the flow aging process to identify idle network flows of the some network flows, and release resources associated with the idle network flows.

19 Claims, 6 Drawing Sheets

STATISTICAL FLOW AGING

FIELD OF THE INVENTION

The present invention relates to computer systems, and in particular, but not exclusively to, flow aging.

BACKGROUND

When a connection, such as a Transmission Control Protocol (TCP), QUIC, or Session Initiation Protocol (SIP) over User Datagram Protocol (UDP) connection, is established, resources are allocated to the connection by the end-node devices. The resources are reserved for the connection until the resources are released when the flow associated with the connection ends. The flow often ends explicitly (e.g., by receiving an RST or FIN packet for TCP) but sometimes the flow disappears leaving the connection hanging and still using resources.

SUMMARY

There is provided in accordance with an embodiment of the present disclosure, a device, including an interface to send and receive packets of network flows, and processing circuitry to track a connection status of each of the network flows, selectively assign some network flows of the network flows having a non-terminated connection status to a flow aging process based on a statistical model of connection termination, operate the flow aging process to identify idle network flows of the some network flows, and release resources associated with the idle network flows.

Further in accordance with an embodiment of the present disclosure the processing circuitry is to operate the flow aging process to establish counters to count packets of the some network flows and identify the idle network flows responsively to non-movement of corresponding ones of the counters.

Still further in accordance with an embodiment of the present disclosure the processing circuitry is to operate the flow aging process to identify the idle network flows responsively to inactivity of the idle network flows for at least a given time delay.

Additionally in accordance with an embodiment of the present disclosure the processing circuitry is to track the connection status of each of the network flows using buckets for corresponding groups of the network flows, the buckets including a given bucket, and assign from the given bucket at least one of the network flows having a non-terminated connection status to the flow aging process responsively to a probability that a quantity of the network flows of the given bucket have the non-terminated connection status or a terminated connection status.

Moreover, in accordance with an embodiment of the present disclosure each of the buckets tracks the connection status of each of four network flows of the network flows.

Further in accordance with an embodiment of the present disclosure the processing circuitry is to probabilistically assign the network flows having a non-terminated connection status to the flow aging process responsively to respective probabilities that quantities of the network flows of respective ones of the buckets have the non-terminated connection status or the terminated connection status.

Still further in accordance with an embodiment of the present disclosure, the device includes a random number generator to generate random or pseudo-random numbers, wherein the processing circuitry is to probabilistically assign the network flows having a non-terminated connection status to the flow aging process responsively to comparing the random or pseudo-random numbers with the respective probabilities.

Additionally in accordance with an embodiment of the present disclosure the processing circuitry is to track the connection status of each of the network flows using flags to indicate whether each of the network flows has the non-terminated connection status or the terminated connection status.

Moreover, in accordance with an embodiment of the present disclosure the processing circuitry is to set the connection status of each of the network flows to indicate the non-terminated connection status responsively to establishment of the network flows, and update the connection status of explicitly ended connections of the network flows to the terminated connection status.

Further in accordance with an embodiment of the present disclosure the processing circuitry is to receive any one or more of the following connection termination packets over the interface Transmission Control Protocol (TCP) RST packets, and TCP FIN packets, and update the connection status of the explicitly ended connections of the network flows to the terminated connection status responsively to receiving the connection termination packets over the interface.

There is also provided in accordance with another embodiment of the present disclosure, a flow aging method, including sending and receiving packets of network flows, tracking a connection status of each of the network flows, selectively assigning some network flows of the network flows having a non-terminated connection status to a flow aging process based on a statistical model of connection termination, operating the flow aging process to identify idle network flows of the some network flows, and releasing resources associated with the idle network flows.

Still further in accordance with an embodiment of the present disclosure the operating includes operating the flow aging process to establish counters to count packets of the some network flows and identify the idle network flows responsively to non-movement of corresponding ones of the counters.

Additionally in accordance with an embodiment of the present disclosure the operating includes operating the flow aging process to identify the idle network flows responsively to inactivity of the idle network flows for at least a given time delay.

Moreover in accordance with an embodiment of the present disclosure the tracking includes tracking the connection status of each of the network flows using buckets for corresponding groups of the network flows, the buckets including a given bucket, and the assigning includes assigning from the given bucket at least one of the network flows having a non-terminated connection status to the flow aging process responsively to a probability that a quantity of the network flows of the given bucket have the non-terminated connection status or a terminated connection status.

Further in accordance with an embodiment of the present disclosure each of the buckets tracks the connection status of each of four network flows of the network flows.

Still further in accordance with an embodiment of the present disclosure the assigning includes probabilistically assigning the network flows having a non-terminated connection status to the flow aging process responsively to respective probabilities that quantities of the network flows of respective ones of the buckets have the non-terminated connection status or the terminated connection status.

Additionally in accordance with an embodiment of the present disclosure, the method includes generating random or pseudo-random numbers, wherein the probabilistically assigning includes probabilistically assigning the network flows having a non-terminated connection status to the flow aging process responsively to comparing the random or pseudo-random numbers with the respective probabilities.

Moreover, in accordance with an embodiment of the present disclosure the tracking includes tracking the connection status of each of the network flows using flags to indicate whether each of the network flows has the non-terminated connection status or the terminated connection status.

Further in accordance with an embodiment of the present disclosure, the method includes setting the connection status of each of the network flows to indicate the non-terminated connection status responsively to establishment of the network flows, and updating the connection status of explicitly ended connections of the network flows to the terminated connection status.

Still further in accordance with an embodiment of the present disclosure, the method includes receiving any one or more of the following connection termination packets over the interface Transmission Control Protocol (TCP) RST packets, and TCP FIN packets, and wherein the updating includes updating the connection status of the explicitly ended connections of the network flows to the terminated connection status responsively to receiving the connection termination packets over the interface.

There is also provided in accordance with still another embodiment of the present disclosure a software product, including a non-transient computer-readable medium in which program instructions are stored, which instructions, when read by a central processing unit (CPU), cause the CPU to track a connection status of each of the network flows, selectively assign some network flows of the network flows having a non-terminated connection status to a flow aging process based on a statistical model of connection termination, operate the flow aging process to identify idle network flows of the some network flows, and release resources associated with the idle network flows.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, when a connection, such as a TCP, QUIC, or SIP over UDP connection, is established, resources are allocated to the connection by the end-node devices. The resources are reserved for the connection until the resources are released when a network flow associated with the connection ends. The network flow often ends explicitly (e.g., by receiving an RST or FIN packet for TCP or other completion message such as a completion message of QUIC or a BYE message of SIP over UDP or any other protocol with explicit termination) but sometimes the network flow disappears leaving the connection hanging and still using resources.

One solution is to have counters running for each network flow (e.g., in the hardware of a network interface controller (NIC)) and software running on a host device that checks the counters periodically. This is because the software running in the host device cannot directly track the packets and therefore this task is offloaded to hardware in the NIC. The counters keep track of packets moving in either direction (being received or being sent). If the counters do not move for a number of checks, this indicates that the relevant network flows have hung, and the resources can be released. However, since most of the sessions end explicitly (e.g., gracefully) the counters and host processor time spent on this process is very wasteful, Another solution is to use software to track the last active time of packets leaving and entering the host and if a network flow is idle for long enough the resources reserved for that network flow are released. This solution also wastes resources.

Embodiments of the present invention solve at least some of the above problems by selectively assigning network flows with a non-terminated connections status to a flow aging process (such as using counters or using software to track the last active time, described above) based on a statistical model of connection termination. Network flows are assigned to the flow aging process based on a probability that the flows have hung. Therefore, less resources are used for flow aging and the flows which are more likely to be in a hung state are evaluated using the more processing intense flow aging process.

A "network flow" or "flow" as used in the specification and claims is defined as a connection over a network between two endpoints, and is typically identified by any suitable packet field or fields which define a bidirectional connection, such as the IP and TCP/UDP 5-tuple of source and destination addresses, source and destination ports, and protocol, which are consistent over all of the packets in the flow, or MPLS or other packet fields.

Embodiments of the present invention are particularly useful where network flows generally end explicitly, for example, in TCP where RST and FIN packets (or other completion message such as a completion message of QUIC or a BYE message of SIP over UDP or any other protocol with explicit termination) are received, but some flows hang. In such cases, assigning all network flows to flow aging would waste unnecessary resources. Additionally, in many cases there in no rush to assign flows to flow aging if resources are available to support the flows.

In some embodiments, the network flows are assigned to flow aging based on the status of a group or bucket of network flows, as described in more detail below.

In some embodiments, the network flows are assigned to buckets and the connection status of the flows is tracked by bucket. For example, X flows are tracked in bucket 0, and the next X flows are tracked in bucket 1, and so on. When a network flow commences, its status (i.e., non-terminated flow) is added to a bucket. When a network flow ends explicitly the status of that flow is updated in its bucket. For example, if bucket 0 tracks network flows 1, 2, 3, and 4, when the flows commence the bucket status for the flows is updated to "1111" to indicate that each flow has commenced. If a packet is received indicating that flow 2 has ended, the bucket status is updated to "1011" to show that flow 2 has ended explicitly. The other flows may also have ended, but since packets indicating that the other flows have explicitly ended have not been received, the status for each of those flows is still equal to 1.

Assuming that 95% of TCP flows end explicitly, then the probability of a bucket having a status of "0000" indicating that all the flows have ended explicitly is equal to 81.5% (i.e., $95\%^4$). Similarly, the probability of a bucket having a status of "0001" or "0010" etc. indicating that three flows have ended explicitly is equal to 17% (i.e., $(95\%^3 \times 5\%) \times 4$). The probability of a bucket having a status of "0011" or "0110" etc. indicating that two flows have ended explicitly is equal to 1.3% (i.e., $(95\%^2 \times 5\%^2) \times 6$). The probability of a bucket having a status of "1101" or "1110" etc. indicating that one of the flows has ended explicitly is equal to 0.04% (i.e., $(95\% \times 5\%^3) \times 4$). The probability of a bucket having a status of "1111" indicating that none of the flows have ended explicitly is equal to 0.0025% (i.e., $5\%^4 \times 4$). The above probabilities may be used to probabilistically assign network flows to the flow aging process.

In some embodiments the status of the buckets is scanned intermittently. A given bucket is then assigned to the flow aging process probabilistically. For example, if bucket 0 has a status of "0101" indicating that two of the flows have ended explicitly, then the non-terminated (which means not explicitly terminated) network flows of that bucket are assigned to aging with a 1.3% probability, whereas if bucket 1 has a status of "0010" indicating that three of the flows have ended explicitly, then the non-terminated network flow of that bucket is assigned to aging with a 17% probability. Therefore, less resources are used for flow aging and the flows which are more likely to be in a hung state are evaluated using the flow aging process.

In some embodiments, the probabilities may be changed according to system needs. For example, if the bucket table is full, more aggressive aging may be applied.

System Description

Figure 1:
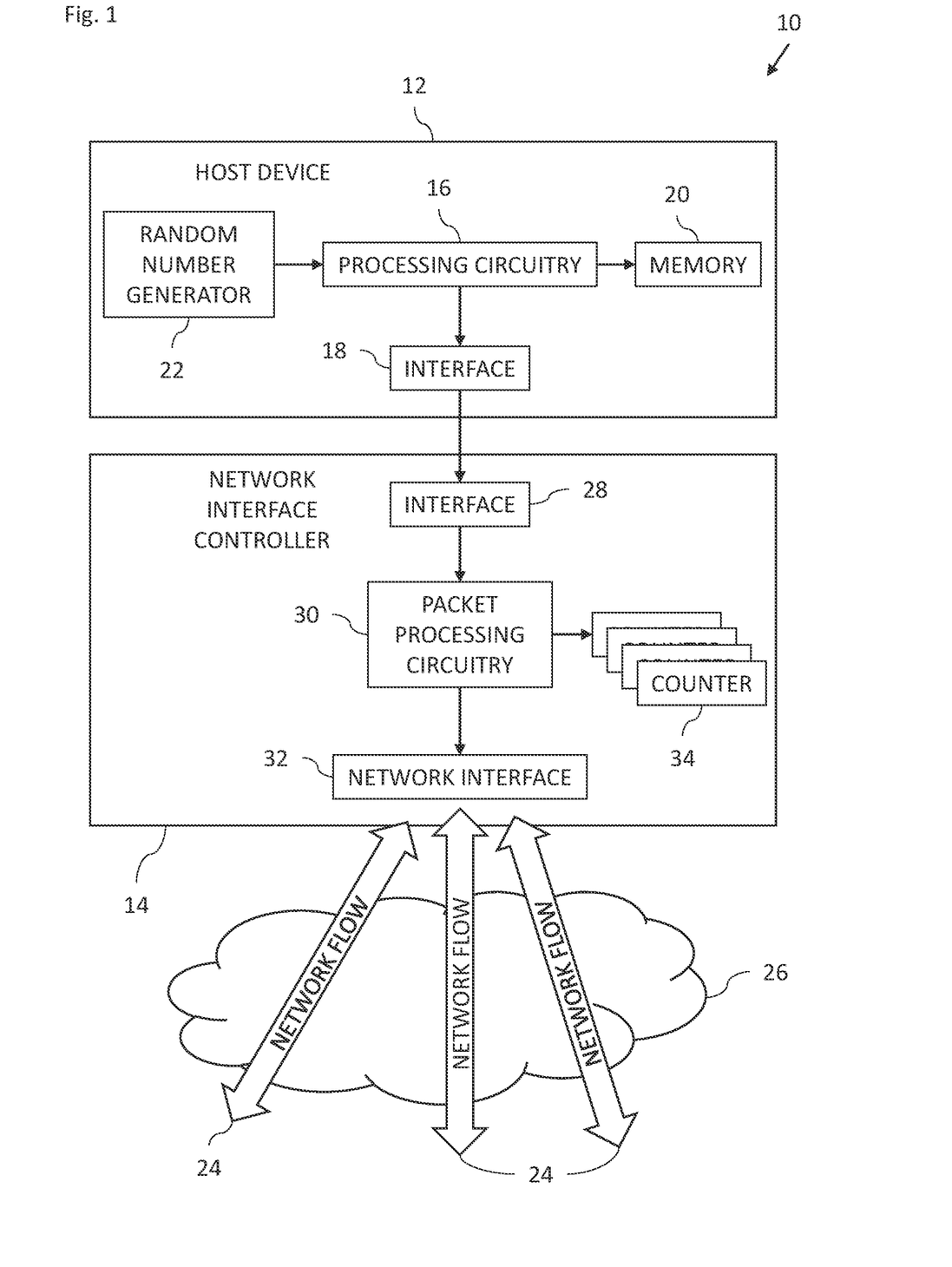
FIG. 1 is a block diagram view of a statistical aging system constructed and operative in accordance with an embodiment of the present invention.

Reference is now made to FIG. 1, which is a block diagram view of a statistical aging system 10 constructed and operative in accordance with an embodiment of the present invention. The system 10 includes a host device 12 and a network interface controller 14.

The host device 12 includes processing circuitry 16, an interface 18, a memory 20, and optionally a random number generator 22. The processing circuitry 16 may be implemented as a central processing unit (CPU). The processing circuitry 16 is described in more detail with reference to FIGS. 4-6. The interface 18 may be any suitable interface to share data with the network interface controller 14, for example a peripheral bus interface. The interface 18 may be configured to send and received packets of network flows 24 over a network 26 via the network interface controller 14. The memory 20 is configured to stored data used by the processing circuitry 16. The random number generator 22 is configured to generate random or pseudo-random numbers.

In some embodiments, the random number generator 22 may be included within the processing circuitry 16. In some embodiments, the functions of the random number generator 22 may be implemented using software executed by the processing circuitry 16.

The network interface controller 14 includes an interface 28, packet processing circuitry 30, and a network interface 32. The interface 28 may be any suitable interface to share data with the host device 12, for example a peripheral bus interface. The packet processing circuitry 30 is configured to process packets received over the network 26 and process packets to be sent over the network 26 via the network interface 32. The packet processing circuitry 30 may include a physical layer (PHY) chip (not shown) and a MAC chip (not shown). In some embodiments, the packet processing circuitry 30 is configured to maintain counters 34 used by the processing circuitry 16 to find idle network flows, described in more detail with reference to FIG. 6 below.

Reference is now made to FIGS. 2A-E, which are schematic views of a bucket 36 of network flows with different connection status 38 and associated probability 39 for use in the system 10 of FIG. 1.

The probabilities 39 described with reference to FIGS. 2A-E assume that 95% of TCP flows end explicitly. The system 10 may also be implemented assuming different percentages of TCP flows end explicitly. The system 10 may also be implemented for other suitable flows that are not TCP flows. FIGS. 2A-E show bucket 36 with different status of the flows 1, 2, 3, and 4, and different associated probabilities 39 that such a status may occur. If a flow has ended explicitly, the status is indicated as "0". If the flow is still active or hung, the status is indicated as "1" based on lack of receipt of a packet indicating explicit ending of the flow.

Figure 2A:
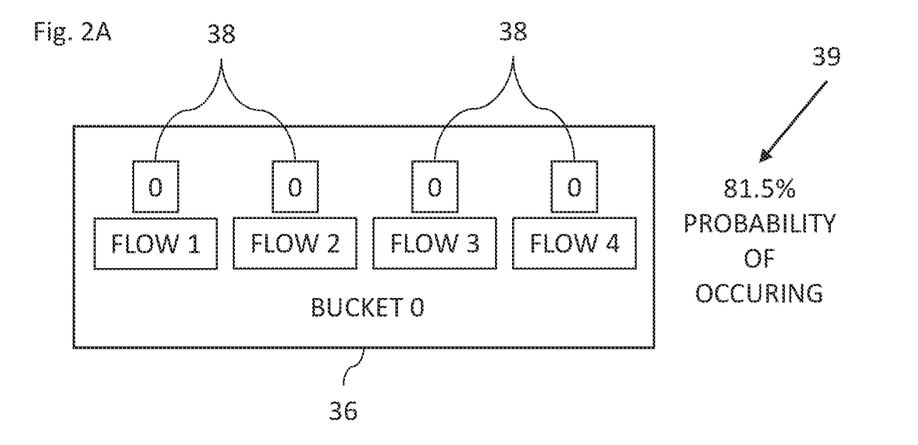
FIGS. 2A-E are schematic views of a bucket of network flows with different connection status and associated probability for use in the system of FIG. 1.

FIG. 2A shows the bucket 36 with a status of "0000" indicating that all the flows have ended explicitly. In such a case, the probability of all the flows having ended explicitly is equal to 81.5% (i.e., $95\%^4$).

Figure 2B:
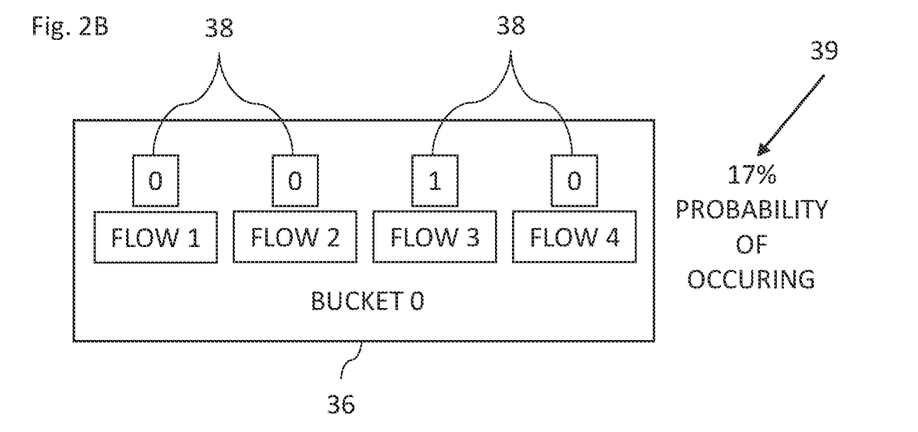

FIG. 2B shows the bucket 36 with a status of "0010" indicating that three flows have ended explicitly. In such a case, the probability that any three flows having ended explicitly is equal to 17% (i.e., $(95\%^3 \times 5\%) \times 4$).

Figure 2C:
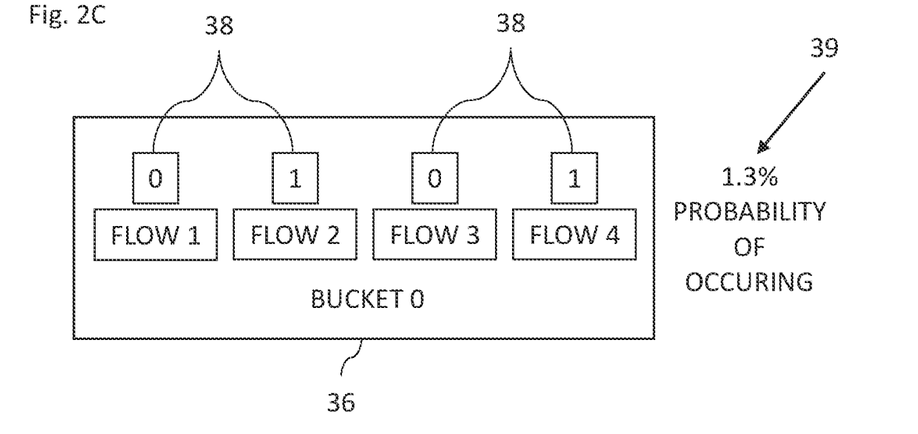

FIG. 2C shows the bucket 36 with a status of "0101" indicating that two flows have ended explicitly. In such a case, the probability that any two flows having ended explicitly is equal to 1.3% (i.e., $(95\%^2 \times 5\%^2) \times 6$).

Figure 2D:
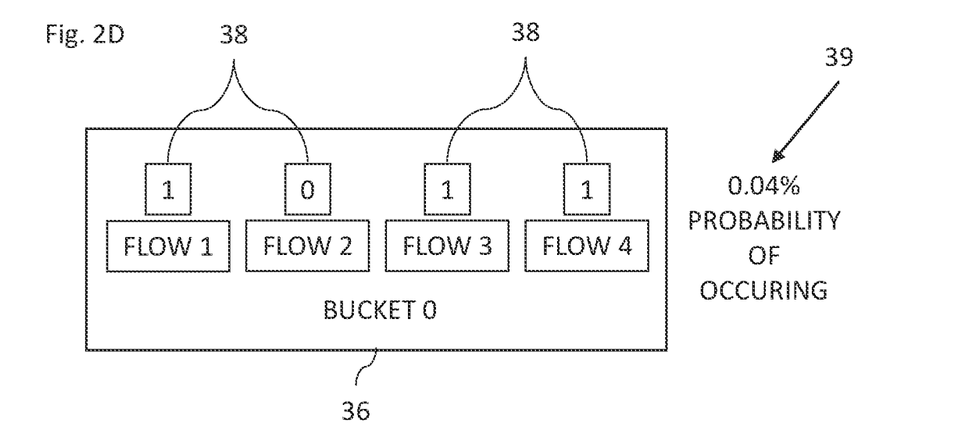

FIG. 2D shows the bucket 36 with a status of "1011" indicating that one flow has ended explicitly. In such a case, the probability that any one flow has ended explicitly is equal to 0.04% (i.e., $(95\% \times 5\%^3) \times 4$).

Figure 2E:
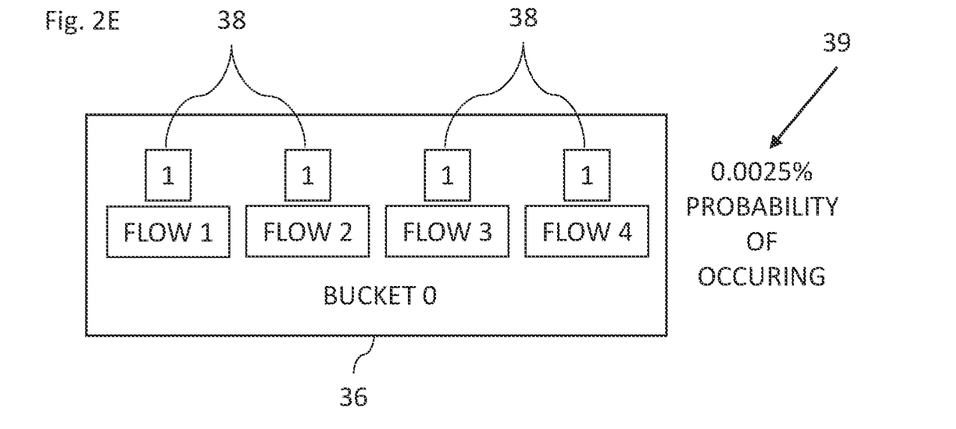

FIG. 2E shows the bucket 36 with a status of "1111" indicating that none of the flows have ended explicitly. In such a case, the probability that none of the flows have ended explicitly is equal to 0.0025% (i.e., $5\%^4 \times 4$).

The above probabilities may be used to probabilistically assign network flows to the flow aging process as described in more detail with reference to FIG. 5.

The buckets 36 may track any number of network flows 24 per bucket 36. In some embodiments, each of the buckets 36 tracks the connection status of four network flows 24.

Figure 3:
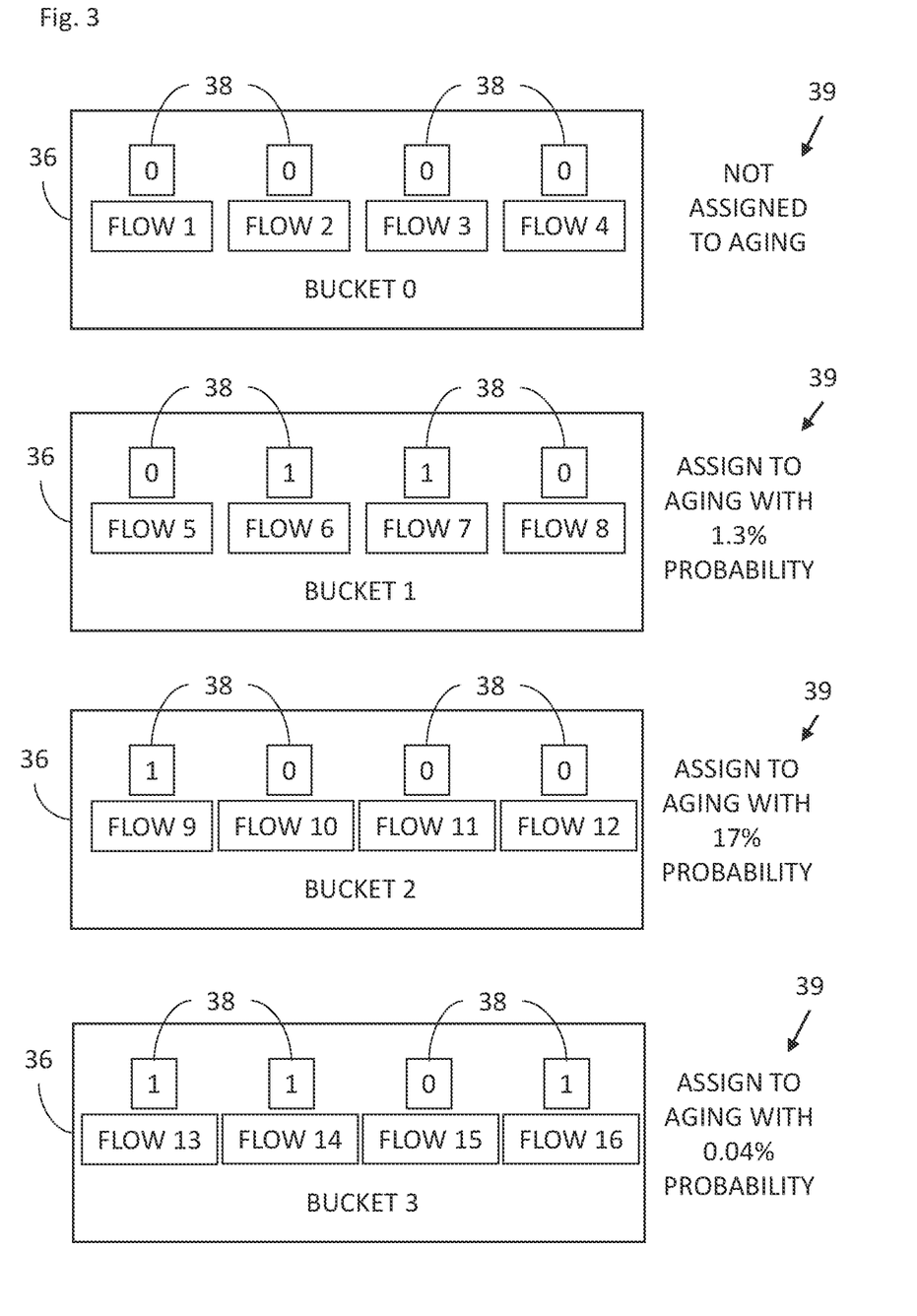
FIG. 3 are schematic views of buckets with different connection status and associated probabilities for use in the system of FIG. 1.

Reference is now made to FIG. 3, which are schematic views of buckets 36 with different connection status 38 and associated probabilities 39 for use in the system 10 of FIG. 1. FIG. 3 shows an example of four buckets, bucket 0, bucket 1, bucket 2, and bucket 3. Bucket 0 tracks the connection status 38 of flows 1-4. Bucket 1 tracks the connection status 38 of flows 5-8. Bucket 2 tracks the connection status 38 of flows 9-12. Bucket 3 tracks the connection status 38 of flows 13-16.

As all the flows in bucket 0 have a "0" status, all the flows have explicitly ended (e.g., based on receiving an RST or FIN packet). None of the flows in bucket 0 are assigned to the aging process and the bucket may be emptied and reused for new flows as they commence.

Bucket 1 shows that flows 5 and 8 have explicitly ended while flows 6 and 7 have not. Therefore, flows 6 and 7 are assigned to the flow aging process for tracking with a 1.3% probability. If, and when, flows 6 and/or 7 are assigned to the flow aging process, the bucket may be emptied and reused for new flows as they, commence. If flows 6 and 7 are not assigned (based on probability) to the flow aging process upon being scanned by the processing circuitry 16, flows 6 and 7 may be assigned (based on probability) to the flow aging process upon being subsequently scanned by the processing circuitry 16 (assuming the flows have not explicitly ended before the subsequent scan).

Bucket 2 shows that flows 10-12 have explicitly ended while flow 9 has not. Therefore, flow 9 is assigned to the flow aging process for tracking with a 17% probability. If, and when, flow 9 is assigned to the flow aging process, the bucket is emptied and reused for new flows as they commence. If flow 9 is not assigned (based on probability) to the flow aging process upon being scanned by the processing circuitry 16, flow 9 may be assigned (based on probability) to the flow aging process upon being subsequently scanned by the processing circuitry 16 unless flow 9 explicitly ends before the subsequent scan.

Bucket 3 shows that flow 15 has explicitly ended while flows 13, 14, 16 have not. Therefore, flows 13, 14, 16 are assigned to the flow aging process for tracking with a 0.04% probability. If, and when, flows 13, 14, 16 are assigned to the flow aging process, the bucket may be emptied and reused for new flows as they commence. If flows 13, 14, 16 are not assigned (based on probability) to the flow aging process upon being scanned by the processing circuitry 16, one or more of the flows 13, 14, 16 may be assigned (based on probability) to the flow aging process upon being subsequently scanned by the processing circuitry 16 (assuming the flows have not explicitly ended before the subsequent scan).

Figure 4:
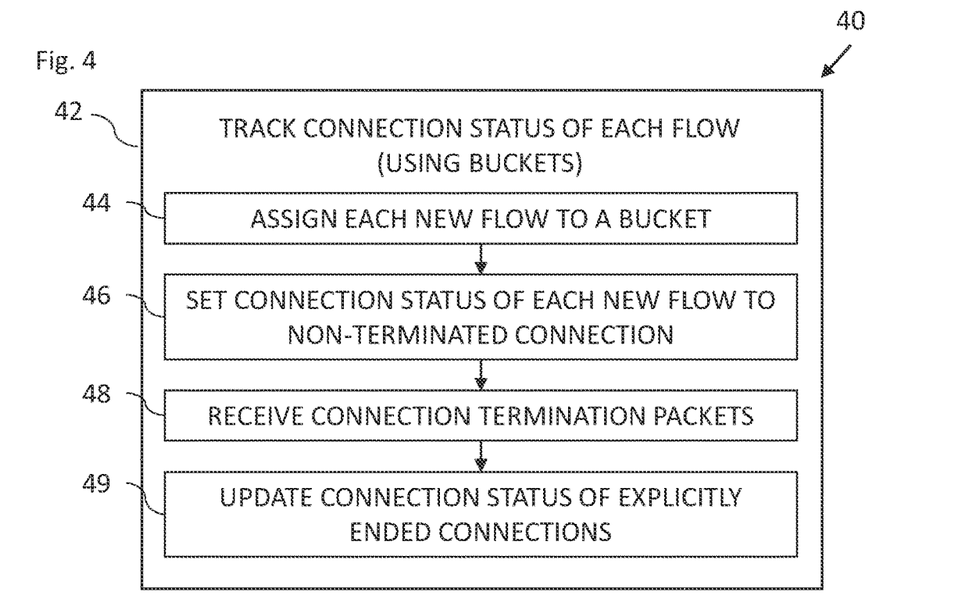
FIG. 4 is a flowchart including steps in a method to track connection status for use in the system of FIG. 1.

Reference is now made to FIG. 4, which is a flowchart 40 including steps in a method to track connection status 38 for use in the system 10 of FIG. 1.

The processing circuitry 16 is configured to track the connection status 38 of each of the network flows 24 (block 42). In some embodiments, the processing circuitry 16 is configured to track the connection status 38 of each of the network flows 24 using buckets 36 for corresponding groups of network flows 24. In some embodiments, the processing circuitry 16 is configured to track the connection status 38 of each of the network flows 24 using flags (e.g., bits 0 and 1) to indicate whether each corresponding network flow 24 has a non-terminated connection status or a terminated connection status (indicating an explicitly ended flow). The flags of the buckets 36 may be stored in a bit map which is intermittently scanned as described in more detail with reference to FIG. 5.

Upon establishing a new network flow, the processing circuitry 16 is configured to assign the new network flow to an unused portion of one of the buckets 36 (block 44) and set the connection status of each new network flow to indicate the non-terminated connection status (e.g., "1") of that new network flow (block 46). The processing circuitry 16 is configured to receive connection termination packets indicating that corresponding network flows 24 have ended (block 48). In some embodiments, the processing circuitry 16 is configured to receive any one or more of the following connection termination packets over the interface: Transmission Control Protocol (TCP) RST packets; and TCP FIN packets.

The processing circuitry 16 is configured to update the connection status 38 of explicitly ended connections of the network flows 24 to the terminated connection status (e.g., "0"), In some embodiments, the processing circuitry 16 is configured to update the connection status 38 of explicitly ended connections of the network flows 24 to the terminated connection status responsively to receiving the connection termination packets over the interface 18.

Figure 5:
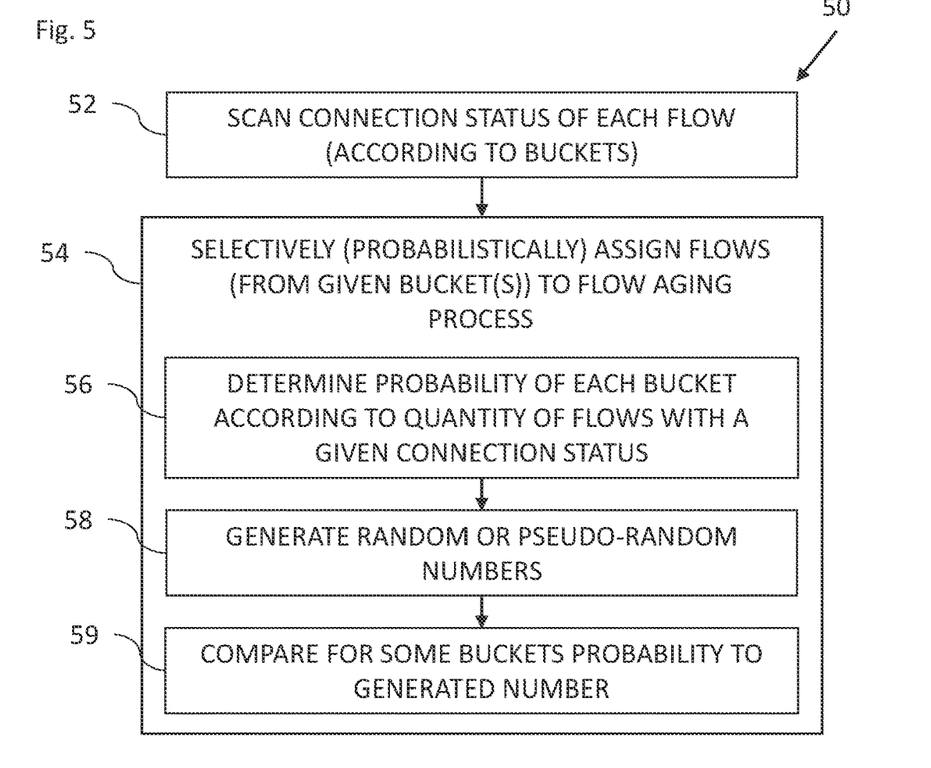
FIG. 5 is a flowchart including steps in a method to assign flows to a flow aging process for use in the system of FIG. 1.

Reference is now made to FIG. 5, which is a flowchart 50 including steps in a method to assign flows 24 to a flow aging process for use in the system 10 of FIG. 1.

The processing circuitry 16 is configured to scan intermittently (e.g., periodically, such as every second or every half-second, or any suitable time interval) the connection status 38 of each of the network flows 24 in the buckets 36 according to buckets 36 (block 52), The connection status 38 of all the network flows 24 may be stored in a bit map, for example.

The processing circuitry 16 is configured to selectively assign some network flows 24 having a non-terminated connection status to the flow aging process based on a statistical model of connection termination (block 54). In some embodiments, the processing circuitry 16 is configured to assign network flows 24 having a non-terminated connection status from a given bucket 36 (i.e., any one of the buckets 36) to the flow aging process responsively to the probability 39 that a quantity of the network flows 24 of the given bucket have the non-terminated connection status or a terminated connection status. In more general terms, the processing circuitry 16 is configured to probabilistically assign the network flows 24 having a non-terminated connection status to the flow aging process responsively to respective probabilities 39 (of respective buckets 36) that quantities of the network flows 24 of the respective buckets 36 have the non-terminated connection status or the terminated connection status.

The step of block 54 is now described in more detail. The processing circuitry 16 is configured to scan the connection status 38 of each network flow 24 in each bucket 36. For a given bucket, the processing circuitry 16 is configured to find the number of network flows 24 which have ended explicitly (e.g., have a terminated connection status 38 equal to "0") or find the number of network flows 24 which have not (yet) ended explicitly (e.g., have a non-terminated connection status 38 equal to "1"). The processing circuitry 16 is configured to determine the probability that the given bucket should be assigned to the flow aging process according to the number of network flows 24 ended explicitly or not (block 56). The step of block 56 is repeated for all of buckets 36 having at least one network flow 24 which has not (yet) ended explicitly. Buckets 36 where all the network flows 24 have ended explicitly may be ignored and recycled for use by new network flows 24. The random number generator 22 (or the processing circuitry 16) is configured to generate random or pseudo-random numbers (block 58). The processing circuitry 16 is configured to probabilistically assign the network flows 24 having a non-terminated connection status to the flow aging process, responsively to comparing the random or pseudo-random numbers with the respective probabilities (block 59) of respective buckets 36. For example, if bucket 2 has a 17% probability of being assigned to the flow aging process (according to the example in FIG. 3), the random number generator 22 generates a random (or pseudo-random) number X between 0 and 1. If X is less than 0.1.7 then flow 9 of bucket 2 is assigned to the flow aging process, else (i.e., the random is not less than (0.17) flow 9 is not assigned to the flow again process (at present).

Figure 6:
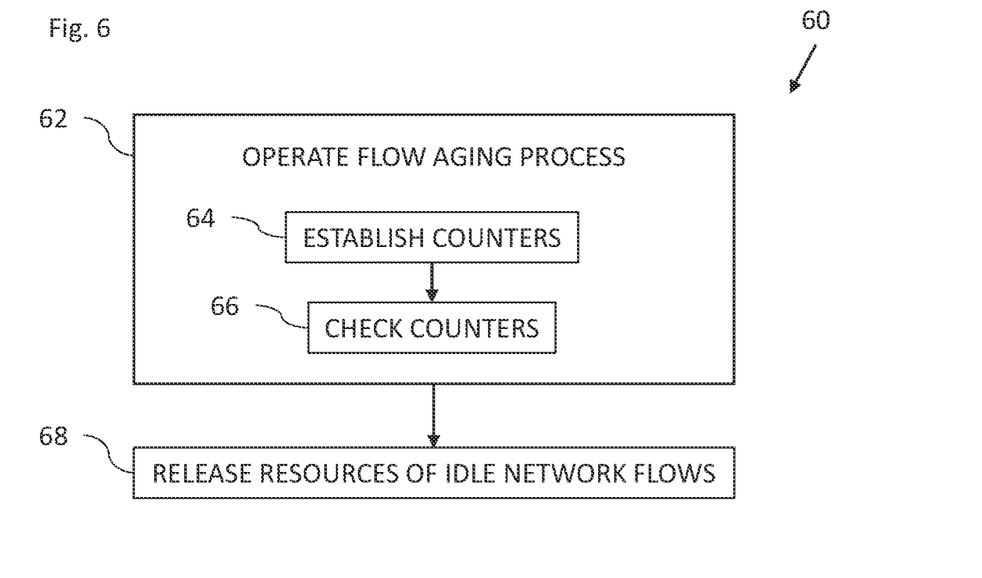
FIG. 6 is a flowchart including steps in a method to operate a flow aging process for use in the system of FIG. 1.

Reference is now made to FIG. 6, which is a flowchart 60 including steps in a method to operate the flow aging process for use in the system 10 of FIG. 1.

The processing circuitry 16 is configured to operate the flow aging process to identify idle network flows from the network flows 24 assigned to the flow aging process by the processing circuitry 16 (block 62). An idle flow is defined to include a network flow which has not had a packet being sent or received for a given threshold time and may be assumed to have ended. The given threshold time can be any suitable time, defined for example by the system administrator, and may depend on the state of the flow and a classification of the flow or other factors.

In some embodiments, the processing circuitry 16 is configured to operate the flow aging process to identify idle network flows responsively to inactivity of the idle network flows for at least a given time delay. The step of block 62 may include the processing circuitry 16 being configured to operate the flow aging process to establish counters 34 (e.g., in the network interface controller 14) to count packets of the network flows 24 assigned to the flow aging process (block 64); and intermittently check the counters 34 to identify the idle network flows responsively to non-movement of corresponding ones of the counters 34 (block 66). For example, if the value of a counter 34 does not change after a number of checks of that counter 34 (with checks being performed intermittently, e.g., every, half-second or second) then it may be assumed that the network flow being counted by that counter 34 has ended and is an idle flow. The processing circuitry 16 is configured to release resources associated with the idle network flows (block 68).

In practice, some or all of the functions of the processing circuitry 16 may be combined in a single physical component or, alternatively, implemented using multiple physical components. These physical components may comprise hard-wired or programmable devices, or a combination of the two. In some embodiments, at least some of the functions of the processing circuitry 16 may be carried out by a programmable processor under the control of suitable software. This software may be downloaded to a device in electronic form, over a network, for example. Alternatively, or additionally, the software may be stored in tangible, non-transitory computer-readable storage media, such as optical, magnetic, or electronic memory.

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and sub-combinations of the various features described hereinabove, as well as variations and modifications thereof which would occur to persons skilled in the art upon reading the foregoing description and which are not disclosed in the prior art.

What is claimed is:

1. A device, comprising:
an interface to send and receive packets of network flows; and
processing circuitry to:
track a connection status of each of the network flows using buckets for corresponding groups of the network flows, the buckets including a given bucket;
find a probability that the given bucket should be assigned to a flow aging process based on: a number of network flows in the given bucket having a non-terminated connection status; or a number of network flows in the given bucket having a terminated connection status;
assign from the given bucket at least one of the network flows having a non-terminated connection status to the flow aging process based on the found probability;
selectively assign some network flows of the network flows having the non-terminated connection status to the flow aging process based on a statistical model of connection termination;
operate the flow aging process to identify idle network flows of the some network flows; and
release resources associated with the idle network flows.

2. The device according to claim 1, wherein the processing circuitry is to operate the flow aging process to establish counters to count packets of the some network flows and identify the idle network flows responsively to non-movement of corresponding ones of the counters.

3. The device according to claim 1, wherein the processing circuitry is to operate the flow aging process to identify the idle network flows responsively to inactivity of the idle network flows for at least a given time delay.

4. The device according to claim 1, wherein each of the buckets tracks the connection status of each of four network flows of the network flows.

5. The device according to claim 1, wherein the processing circuitry is to probabilistically assign the network flows having the non-terminated connection status to the flow aging process responsively to respective probabilities that quantities of the network flows of respective ones of the buckets have the non-terminated connection status or the terminated connection status.

6. The device according to claim 5, further comprising a random number generator to generate random or pseudo-random numbers, wherein the processing circuitry is to probabilistically assign the network flows having the non-terminated connection status to the flow aging process responsively to comparing the random or pseudo-random numbers with the respective probabilities.

7. The device according to claim 1, wherein the processing circuitry is to track the connection status of each of the network flows using flags to indicate whether each of the network flows has the non-terminated connection status or the terminated connection status.

8. The device according to claim 7, wherein the processing circuitry is to:
set the connection status of each of the network flows to indicate the non-terminated connection status responsively to establishment of the network flows; and
update the connection status of explicitly ended connections of the network flows to the terminated connection status.

9. The device according to claim 8, wherein the processing circuitry is to:

receive any one or more of the following connection termination packets over the interface: Transmission Control Protocol (TCP) RST packets; and TCP FIN packets; and update the connection status of the explicitly ended connections of the network flows to the terminated connection status responsively to receiving the connection termination packets over the interface.

10. A flow aging method, comprising:

sending and receiving packets of network flows using buckets for corresponding groups of the network flows, the buckets including a given bucket;

finding a probability that the given bucket should be assigned to a flow aging process based on: a number of network flows in the given bucket having a non-terminated connection status; or a number of network flows in the given bucket having a terminated connection status;

assigning from the given bucket at least one of the network flows having a non-terminated connection status to the flow aging process based on the found probability;

tracking a connection status of each of the network flows;

selectively assigning some network flows of the network flows having the non-terminated connection status to the flow aging process based on a statistical model of connection termination;

operating the flow aging process to identify idle network flows of the some network flows; and releasing resources associated with the idle network flows.

11. The method according to claim 10, wherein the operating includes operating the flow aging process to establish counters to count packets of the some network flows and identify the idle network flows responsively to non-movement of corresponding ones of the counters.

12. The method according to claim 10, wherein the operating includes operating the flow aging process to identify the idle network flows responsively to inactivity of the idle network flows for at least a given time delay.

13. The method according to claim 10, wherein each of the buckets tracks the connection status of each of four network flows of the network flows.

14. The method according to claim 10, wherein the assigning includes probabilistically assigning the network flows having the non-terminated connection status to the flow aging process responsively to respective probabilities that quantities of the network flows of respective ones of the buckets have the non-terminated connection status or the terminated connection status.

15. The method according to claim 14, further comprising generating random or pseudo-random numbers, wherein the probabilistically assigning includes probabilistically assigning the network flows having the non-terminated connection status to the flow aging process responsively to comparing the random or pseudo-random numbers with the respective probabilities.

16. The method according to claim 10, wherein the tracking includes tracking the connection status of each of the network flows using flags to indicate whether each of the network flows has the non-terminated connection status or the terminated connection status.

17. The method according to claim 16, further comprising:

setting the connection status of each of the network flows to indicate the non-terminated connection status responsively to establishment of the network flows; and updating the connection status of explicitly ended connections of the network flows to the terminated connection status.

18. The method according to claim 17, further comprising receiving any one or more of the following connection termination packets over the interface: Transmission Control Protocol (TCP) RST packets; and TCP FIN packets, and wherein the updating includes updating the connection status of the explicitly ended connections of the network flows to the terminated connection status responsively to receiving the connection termination packets over the interface.

19. A software product, comprising a non-transient computer-readable medium in which program instructions are stored, which instructions, when read by a central processing unit (CPU), cause the CPU to:

track a connection status of each of the network flows using buckets for corresponding groups of the network flows, the buckets including a given bucket;

find a probability that the given bucket should be assigned to a flow aging process based on: a number of network flows in the given bucket having a non-terminated connection status; or a number of network flows in the given bucket having a terminated connection status;

assign from the given bucket at least one of the network flows having a non-terminated connection status to the flow aging process based on the found probability;

selectively assign some network flows of the network flows having the non-terminated connection status to the flow aging process based on a statistical model of connection termination;

operate the flow aging process to identify idle network flows of the some network flows; and release resources associated with the idle network flows.

* * * * *